Dec. 10, 1968   E. G. SPISAK   3,415,575
BALANCING WEIGHT HOLDER FOR WHEEL COVER
Filed Nov. 17, 1966
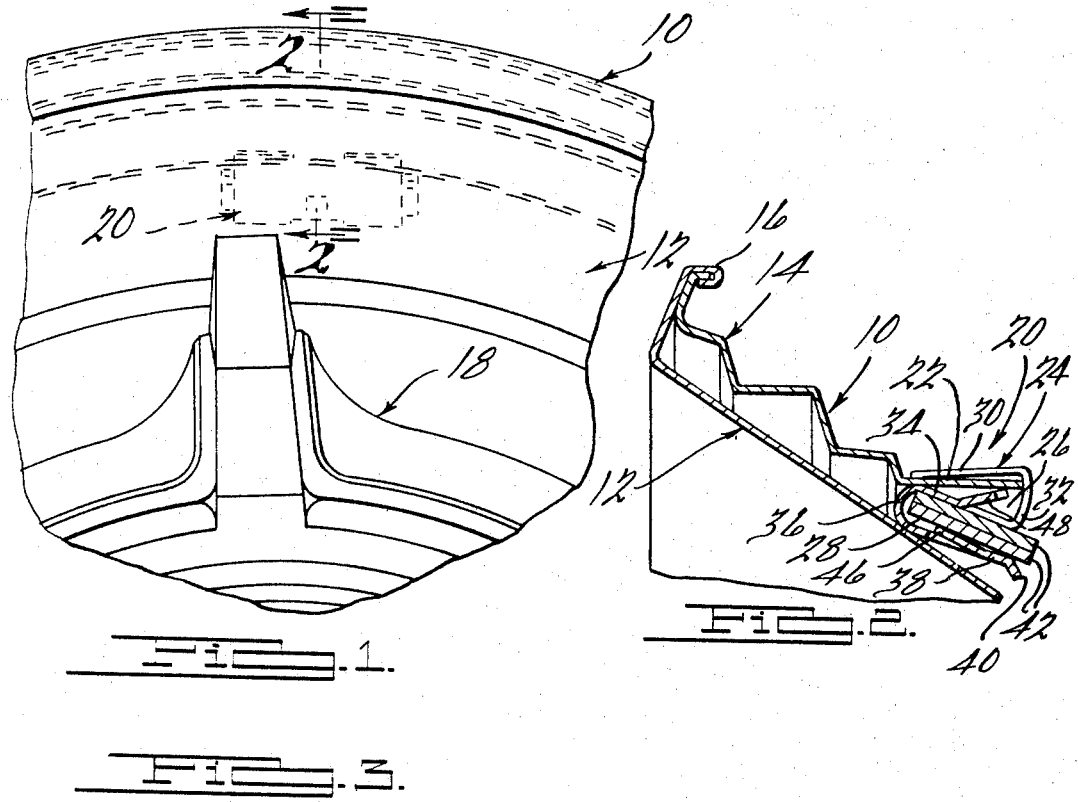
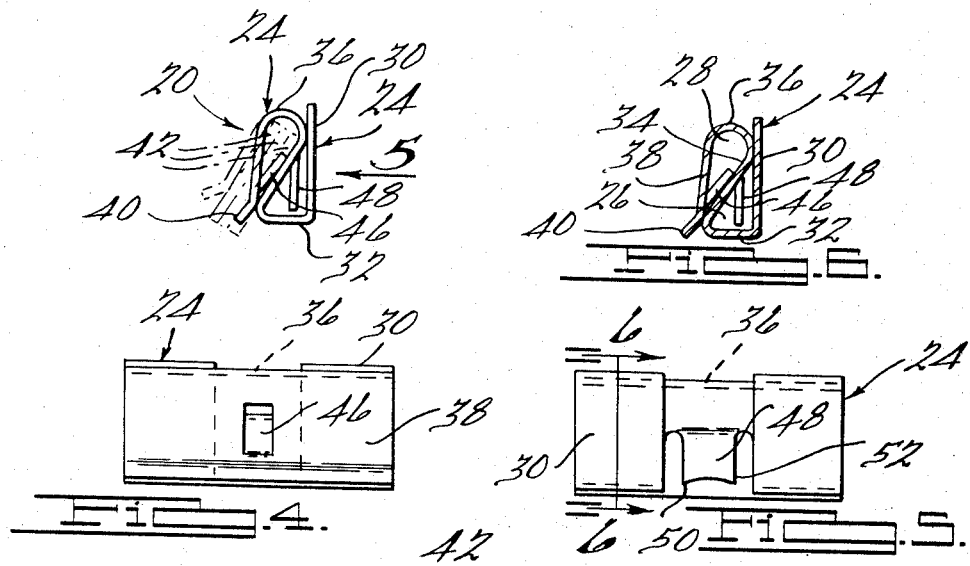
INVENTOR.
Edward G. Spisak
BY
Harness, Dickey & Pierce
ATTORNEYS.

United States Patent Office 3,415,575
Patented Dec. 10, 1968

3,415,575
BALANCING WEIGHT HOLDER FOR WHEEL COVER
Edward G. Spisak, Wayne, Mich., assignor to Gar Wood Industries, Inc., Ypsilanti, Mich., a corporation of Michigan
Filed Nov. 17, 1966, Ser. No. 595,174
7 Claims. (Cl. 301—5)

ABSTRACT OF THE DISCLOSURE

A wheel cover assembly comprising a wheel cover member having balancing weight support means thereon; weight attaching means adapted to secure at least one balancing weight on the support means of the wheel cover member and comprising a one-piece stamped metal clip member having a first portion defining a generally U-shaped portion adapted to clampingly receive and engage the support means and a second portion defining another U-shaped channel portion adapted to clampingly receive and engage the balancing weight, the second portion being formed with a struck-out area adapted to resiliently engage the balancing weight to positively secure the same within the clip, and at least one balancing weight clampingly disposed within the second portion of the clip member.

---

This invention relates generally to wheel covers and, more particularly, to a new and improved means for balancing wheel covers preparatory to mounting them on vehicle wheels.

The increasingly popular use of various types of ornate hub members, medallions, "spinners," and related decorative components on vehicle wheel covers has resulted in a need for balancing such wheel covers before the same are mounted on their associated vehicle wheels. Balancing means which have heretofore been used for balancing the vehicle wheels themselves have not been adaptable for balancing the wheel covers due to their relatively large size and unique mounting characteristics. More particularly, wheel balancing means heretofore known and used have not been applicable to vehicle wheel covers since such means have been provided with relatively bulky spring clip means adapted to engage the periphery vehicle wheel rim and thus such means have not been easily attached to the wheel covers. Moreover, previously known balancing devices have been provided in relatively large incremental sizes or weights and thus can not be used for balancing wheel covers which are only slightly out of balance.

The present invention is directed toward a new and improved wheel cover balancing assembly which overcomes the aforesaid objectionable characteristics of heretofore known and used wheel balancing devices through the provision of a novel weight attaching clip device which is adapted to be mounted directly on the axially inner face of a wheel cover and thereby support from one to a plurality of balancing weights on the wheel cover. More particularly, the aforesaid clip device is adapted to be attached to an axially extending flange portion of the wheel cover and support from one to a plurality of balancing weights of relatively smaller incremental size. Accordingly, the present invention permits balancing wheel covers wihch are only slightly out of balance, as well as wheel covers which are substantially unbalanced.

It is accordingly a primary object of the present invention to provide a new and improved means for balancing vehicle wheel covers.

It is a more particular object of the present invention to provide a new and improved wheel cover balancing assembly comprising a clip device adapted to secure from one to a plurality of balancing weights on a decorative vehicle wheel cover.

It is another object of the present invention to provide a new and improved wheel cover balancing assembly of the above character which is of a simple design, is easy to assemble, and economical to commercially manufacture.

It is a further object of the present invention to provide a new and improved wheel cover balancing assembly of the above character which is adapted to be positively attached to an associated vehicle wheel cover.

Other objects and advantages of the present invention will become apparent from the following detailed description, taken in conjunction with the accompanying drawing, wherein:

FIGURE 1 is a fragmentary side elevational view of a vehicle wheel cover having the improved wheel balancing assembly of the present invention in operative association therewith;

FIGURE 2 is a transverse cross-sectional view taken substantially along the line 2—2 of FIGURE 1;

FIGURE 3 is an end elevational view of the spring clip member incorporated in the wheel balancing assembly of the present invention;

FIGURE 4 is a side elevational view of the spring clip member illustrated in FIGURE 3;

FIGURE 5 is a side elevational view of the spring clip member illustrated in FIGURE 3; as taken in the direction of the arrow 5 thereof;

FIGURE 6 is a transverse cross-sectional view taken substantially along the line 6—6 of FIGURE 5, and FIGURE 7 is a side elevational view of one of the balancing weights incorporated in the wheel balancing assembly of the present invention.

For convenience of description, the terms "axially inner," "axially outer" and words of similar import will have reference to the wheel cover of the present invention hereinafter described in detail, with the axially outer side of the subject wheel cover being at the left side of FIGURE 2. Likewise, the terms "radially inner," "radially outer," and derivatives thereof will have reference to a geometric center of the wheel cover of the present invention and the various component parts thereof.

Referring now to the drawing, as best seen in FIGURE 1, a decorative wheel cover 10 is shown as comprising a central hub member 12 which is fixedly secured to a cover retaining or mounting ring 14 by having its radially outer peripheral edge portion 16 crimped or similarly formed radially inwardly around the outer periphery of the retaining ring 14. As is well known in the art, the retaining ring 14 functions to detachably secure the wheel cover 10 to an associated vehicle wheel (not shown). The hub member 12 may be of any desired design and may, for example, be provided with a decorative "spinner," or like member 18, as best seen in FIGURE 1.

In accordance with the principles of the present invention, the wheel cover 10 is provided with one or more balancing assemblies, generally designated 20, which are adapted to be fixedly secured to an axially inwardly projecting flange section 22 formed on the radial innermost portion of the ring member 14, with the result that the wheel cover 10 is balanced preparatory to being mounted on its associated vehicle wheel. As best seen in FIGURES 2 and 3, each of the assemblies 20 comprises means in the form of a spring clip member 24 for securing one or more balancing weights to the flange section 22 of the wheel cover 10. The clip members 24 are preferably each of a one-piece stamped metal construction and fabricated of a suitable spring steel or the like. The members 24 are of a generally S-shaped configuration in transverse cross-section, whereby each defines two substantially U-shaped channel portions 26 and 28. In general, the channel portion 26 is adapted to receive the flange section 22 of the wheel cover ring member 14, and the portion 28 is adapted to receive one or more balancing weights, as will later be described.

As illustrated in FIGURE 2, the spring clip member 24 comprises a substantially axially extending section 30 which terminates at its axially innermost portion in a radially inwardly extending section 32. The section 32 in turn terminates at its radially innermost portion in an axially and radially outwardly inclined section 34, whereby the sections 30, 32 and 34 define the channel portion 26. The radially outermost portion of the section 34 terminates in or is formed with a radially inwardly extending section 36 which is formed at its radially innermost portion with an axially inwardly extending section 38. As illustrated, the sections 34, 36 and 38 define the channel portion 28. In a preferred construction of the present invention, the axially innermost portion of the clip section 38 is formed with a radially inwardly directed shoulder portion 40 which facilitates insertion of balancing weights within the channel portion 28, as will be described.

As best seen in FIGURES 2 and 6, the spring clip member 24 is adapted to support from one to a plurality of wheel cover balancing weights, generally designated 42, on the wheel cover 10. The weights 42 are preferably of an elongated rectangular configuration (see FIGURE 7) and are adapted to be adjacently oriented or "stacked" upon being inserted between the clip sections 34 and 38 in the manner illustrated in FIGURE 6. The balancing weights 42 are preferably formed with outwardly extending ears or tab portions 44 on the four corners thereof (see FIGURE 7), and are of a length such that when they are disposed within the channel portion 28 of the clip member 24, the tap portions 44 extend axially outwardly beyond the clip section 36, whereby to prevent any relative indexing movement of the balancing weights 42 with respect to the clip member 24. It is contemplated that the balancing weights 42 may be provided of various thicknesses so that one or more of such weights may be used to accurately balance the wheel cover 10 even when it is only slightly out of balance.

As best shown in FIGURE 2, the spring clip member 24 is adapted to be mounted directly on the flange section 22 of the ring 14. This may be accomplished by orienting the clip member 24 such that the channel 26 confronts the flange section 22, and thereafter forcing the member 24 axially outwardly so that the flange section 22 is received interadjacent the clip sections 30 and 34. It will be apparent, of course, that such mounting of the clip member 24 may be accomplished with a minimum amount of effort, yet the member 24 will be positively retained on the ring 14 due to the flange section 22 thereof being clampingly engaged between the clip sections 30 and 34.

As illustrated in FIGURES 2, 3 and 4, the clip section 38 may be formed with a radially and axially outwardly extending struck-out locking portion 46 which extends axially outwardly from and is integrally formed on the clip section 38. The locking portion 46 is adapted to firmly engage the radially inner side of the balancing weight(s) 42 to firmly secure the weights 42 within the channel portion 28. In a similar manner, an anti-indexing tab portion 48, which extends radially outwardly and axially inwardly, may be struck-out of the clip section 34. As best seen in FIGURE 5, the radially outermost portion of the tab section 48 is of a generally arcuate configuration and defines substantially pointed corner portions 50 and 52. When the clip member 24 is mounted on the flange section 22 of the cover ring 14, the corner portions 50 and 52 resiliently engage the radially inner side of the flange section 22, whereby to prevent any relative indexing movement of the clip member 24 with respect to the flange section 22, and hence prevent any indexing movement of the entire balancing assembly 20 relative to the wheel cover 10.

It will be seen from the above description that the present invention provides a novel wheel cover balancing assembly 20 which is adapted to find universality of application by virtue of the fact that said assembly may be mounted on virtually any type of wheel cover, and that the spring clip member 24 thereof may be used to attach from one to a plurality of balancing weights to the wheel cover. Accordingly, the assembly 20 will find particularly useful application in balancing wheel covers which are only slightly out of balance, as well as wheel covers which are substantially unbalanced. It will be apparent that the balancing assembly 20 of the present invention, by virtue of being of a relatively simple design, may be economically manufactured and therefore is attractive from the standpoint of economy of production. It will be noted, of course, that the assembly 20 of the present invention is not limited in use to wheel covers such as the cover 10, but instead may be used on various other types of wheel covers, as well as directly on vehicle wheels.

What is claimed is:
1. In a vehicle wheel cover assembly,
a wheel cover member having a balancing weight support flange means thereon,
at least one balancing weight, and
weight attaching means engageable with said balancing weight and adapted to positively support the same on the wheel cover, said weight attaching means comprising a generally S-shaped one-piece metal clip defining first and second channel portions, one channel removably and clampingly engaging said support flange means and the other channel clampingly engaging said balancing weight.

2. The invention as set forth in claim 1 which includes means for preventing relative indexing movement between said weight attaching means, said balancing weight and the wheel cover.

3. The invention as set forth in claim 2 wherein said means for preventing relative indexing movement between said weight attaching means and said balancing weight comprising at least one outwardly extending ear portion on said weight.

4. The invention as set forth in claim 1 wherein said weight attaching means comprises a one-piece stamped metal spring clip member, said member comprising a first portion defining a generally U-shaped channel adapted to clampingly receive a portion of the wheel cover therewithin and a second portion defining another generally U-shaped channel adapted to clampingly receive said balancing weight therewithin.

5. The invention as set forth in claim 4 wherein said first portion is formed with a struck-out portion having substantially pointed sections engageable with said portion of the wheel cover for preventing relative indexing movement between said clip and the wheel cover.

6. The invention as set forth in claim 4 wherein said second portion is formed with a struck-out portion adapted to resiliently engage said balancing weight to positively secure the same to said clip, and wherein said second portion is adapted to clampingly receive from one to a plurality of balancing weights therewithin.

7. In combination in a wheel cover assembly, a wheel cover member having balancing weight support means thereon, at least one balancing weight, weight attaching means securing said weight on said support means and comprising a one-piece stamped metal spring clip member having a first portion defining a generally U-shaped channel clampingly receiving and engaging said support means and a second portion defining another U-shaped channel portion clampingly receiving and engaging said balancing weight, said second portion being formed with a struck-out area adapted to resiliently engage said balancing weight to positively secure the same within said clamp member.

References Cited

UNITED STATES PATENTS

| 2,926,953 | 3/1960 | Lyon | 301—5 |
| 2,926,955 | 3/1960 | Lyon | 301—5 |
| Re. 18,578 | 8/1932 | Couture | 301—5 |
| 2,019,556 | 11/1935 | Ash | 301—5 |
| 2,029,561 | 2/1936 | Du Sang | 301—5 |
| 2,221,747 | 11/1940 | Turner | 301—5 |

FOREIGN PATENTS 854,833  11/1960  Great Britain.

RICHARD J. JOHNSON, *Primary Examiner.*

U.S. Cl. X.R.

301—37